United States Patent [19]

Nakata et al.

[11] 4,434,351

[45] Feb. 28, 1984

[54] METHOD AND SYSTEM FOR DETERMINING WELD QUALITY IN RESISTANCE WELDING

[75] Inventors: Shuji Nakata, Toyonaka; Yoshio Kawaguchi, Yokohama; Akira Nishimura, Yokosuka, all of Japan

[73] Assignee: Nissan Motor Company, Limited, Kanagawa, Japan

[21] Appl. No.: 268,887

[22] Filed: Jun. 1, 1981

[30] Foreign Application Priority Data

Jun. 2, 1980 [JP] Japan ................................. 55-72830

[51] Int. Cl.$^3$ .............................................. B23K 11/24
[52] U.S. Cl. ................................. 219/117.1; 219/109
[58] Field of Search ...................... 219/109, 110, 117.1

[56] References Cited

U.S. PATENT DOCUMENTS 3,573,421 4/1971 Vanderhelst ........................ 219/110

FOREIGN PATENT DOCUMENTS 2813260 10/1979 Fed. Rep. of Germany ...... 219/109
1154032 4/1969 United Kingdom .
1162915 4/1969 United Kingdom .
1434349 5/1976 United Kingdom .
2022290 12/1979 United Kingdom ................ 219/110

OTHER PUBLICATIONS

C. A. Keskimaki, "Dynamic Resistance Spot Weld Analyzer", Western Electric Technical Digest #46, 4/77, pp. 21-22.

Primary Examiner—C. C. Shaw
Attorney, Agent, or Firm—Lowe, King, Price & Becker

[57] ABSTRACT

A method and system for determining weld quality in resistance welding in such a manner that acceptance or unacceptance is determined by comparing with their respective reference values the electrode voltage, the electrode current time, the number of electrode voltage pulse signals in excess of the reference value, and the integral of difference between the electrode voltage in excess of a base voltage and the base voltage, independently or simultaneously, in addition to the comparison of the electrode resistance with its reference value. The relatively low-priced system according to the present invention can determine weld quality accurately even when the electrode tips are deformed or crushed so as to form other current path areas.

7 Claims, 9 Drawing Figures

METHOD AND SYSTEM FOR DETERMINING WELD QUALITY IN RESISTANCE WELDING

BACKGROUND OF THE INVENTION

1. Field of the Invention

The present invention relates to a method and system for determining weld quality in resistance welding, and more specifically to a method and system for determining weld quality in such a manner that acceptance or unacceptance is determined by comparisons with their respective reference values of the electrode voltage, the electrode current time, the number of the electrode voltage pulse signals in excess of a reference value, and the integral of the difference between the electrode voltage in excess of a base voltage and the base voltage, independently or simultaneously, in addition to the comparison of the electrode resistance with its reference value.

2. Description of the Prior Art

There are various techniques of ensuring weld quality without destroying the welded products during welding work, such as a welding current monitoring system, a welding energy monitoring system, an electrode tip resistance monitoring system, an electrode tip voltage monitoring system, an electrode tip potential monitoring system, and so on.

In the welding current monitoring system, although it is very effective in discovering power failure or disconnection of the secondary coil of the power transformer, since the welding current is monitored, it is not particularly effective in detecting deterioration of weld quality due to changes in the contact conditions between members to be welded, the welding current, the shape of the electrode tips, and so on.

In the welding energy monitoring system, although the total electrical energy supplied to the welded portions is monitored, since weld quality is determined not by the total energy but by the distribution of energy density with respect to time, it is virtually impossible to monitor welding quality when the area of the weld changes according to the weld conditions.

In the electrode tip resistance monitoring system, although the resistance between the electrode tips is detected and then the weld quality is monitored depending upon the detected resistance, since the resistance between the electrode tips impose a serious influence upon the area of the welding current path between the members to be welded, it is virtually impossible to determine the weld quality when the shape of the electrode tips is deformed or the electrodes are crushed so as to form other current path shapes.

In the electrode tip voltage monitoring system, the voltage between the electrode tips is detected and the weld quality is determined from consideration of the detected voltage. The electrode tip voltage has generally a close relationship to the rise in temperature of the weld, and to the rate of bead penetration especially in the case of spot welding.

In the case where the pressure applied to the electrodes is great and the members to be welded are thin, since the current path is formed according to the electrode pressure and the shape of the electrode tips, even if the electrode current changes because of the formation of other current paths, it is possible to determine the weld quality. However in the case where relatively thick members are welded, or where high-tension steel plates are welded, or where a relatively low electrode pressure is applied therebetween, or where press-manufactured products are welded, it is impossible to ensure the appropriate current path area between members to be welded (this current path area has a relationship to the bead area), and therefore there are some cases in which it is impossible to obtain the required bead diameter.

Further, in the case where the electrode tips are crushed, since a bead having a diameter greater than that required is obtained, it is impossible to determine the weld quality accurately.

In the electrode tip potential monitoring system, although it may be effective in determining weld quality, since the rate of detection is relatively slow when this system is applied to spot welding on site, in practice it is very difficult to measure the potential accurately because of noise.

As described hereinabove, in the conventional methods of determining weld quality in resistance welding there exist no desirable methods because of reasons such as that the welding factors are related to the weld quality only within a defined range, or have no direct relationship to the weld quality, or are insufficient to determine the weld quality.

SUMMARY OF THE INVENTION

With these problems in mind therefore, it is the primary object of the present invention to provide a method of determining weld quality accurately even if the electrode tips are deformed or crushed so as to form other current path areas.

It is another object of the present invention to provide a relatively low-priced system for determining weld quality acurately which can be used at every welding site.

To achieve the above-mentioned objects, the method of determining weld quality in resistance welding according to the present invention comprises the steps of comparing with their respective reference values the electrode voltage, the electrode current time, the number of the electrode voltage pulse signals in excess of the reference value, and the integral of the difference between the electrode voltage in excess of a base voltage and the base voltage, independently or simultaneously, in addition to the step of comparing the electrode resistance with the reference value.

In other words, the system for determining weld quality in resistance welding according to the present invention comprises a voltage sensor, a comparator/discriminator, a reference voltage generator, a current-/current-time discriminator, a pulse count discriminator, a reference pulse-count memory unit, a differential amplifier, an integrator, a comparator/discriminator, a reference integral generator, and a discrimination display unit, in addition to a current sensor, a current time controller, and a reference resistance generator.

BRIEF DESCRIPTION OF THE DRAWINGS

The features and advantages of the method and system for determining weld quality in resistance welding according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

Prior to the detailed description of the preferred embodiments according to the present invention, a description will be made hereinbelow of graphical representations showing the fundamental results obtained from various experiments on resistance welding.

The above-mentioned various experiments have confirmed the following facts, and the results thereof are applied to the present method and system of determining weld quality.

The resistance between electrodes between which the members to be welded are pinched (including the electrode tips in the case of spot welding) has a close relationship to the contact area of the members to be welded, that is, the current path area in resistance welding while the electrode current is flowing. Additionally, it is possible to observe the electrode resistance depending upon the current path area in the weld during the welding process.

Further, the voltage between the electrodes has a close relationship to the rise in temperature of the weld, and the curve indicating the electrode voltage with respect to time can be determined according to the kinds, shapes, and thicknesses of the members to be welded and also to the shapes and sizes of the electrode tips. Therefore, it is possible to select a voltage curve suitable to the desired rate of bead penetration in the weld.

Further, the effective electrode voltage is the voltage above a predetermined base or reference voltage and the consequent change in welding time has a great effect upon the quality of the weld.

The present invention is based upon the results of the experiments described above. In other words, the present invention provides a method of determining weld quality in resistance welding in such a manner as to determine whether or not the electrode resistance detected immediately before the welding current is cut off during the welding process is within an allowable resistance range, and whether or not the electrode voltage is above a necessary reference resistance value, whether or not the integral of the difference between the electrode voltage in excess of a predetermined base voltage and the predetermined base voltage is more than a predetermined reference voltage integral, in order to determine that the current path area between the members to be welded, that is the bead area, is more than the required value and that the rate of bead penetration is sufficient.

With reference to the accompanying drawings, the present invention will be described hereinbelow.

Figure 1:
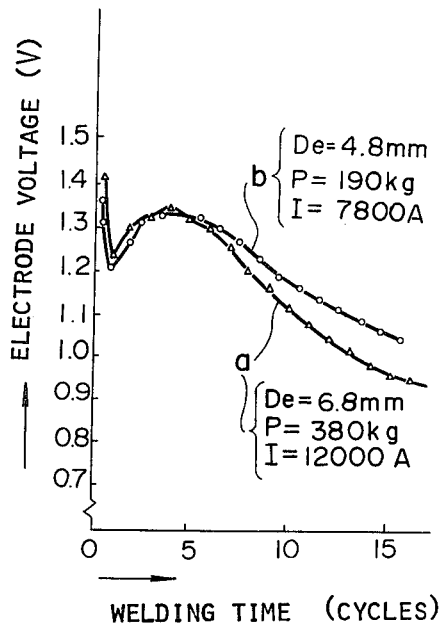
FIG. 1 is a graphical representation of typical relationships between electrode voltage and welding time when two mild-steel plates are spot-welded together.

FIG. 1 shows typical relationships between the voltage between the electrode tips and the welding time (hereinafter referred to simply as a "voltage curve"). Now, if De denotes the mean diameter of the contact between the electrode tip and the member to be welded (hereinafter referred to simply as the "electrode tip diameter"), P denotes the pressure applied between the electrodes, and I denotes the welding current, the curve a shows the case where De is 6.8 mm, P is 380 kg, and I is 7800 A, and the curve b shows the case where De is 4.8 mm, P is 190 kg, and I is 7800 A. The welding time is shown by the number of cycles of the alternating current passed therethrough.

As is well understood, FIG. 1 indicates that there is no great difference in the electrode voltage between the curves a and b even when the electrode tip diameter differs greatly.

Figure 2:
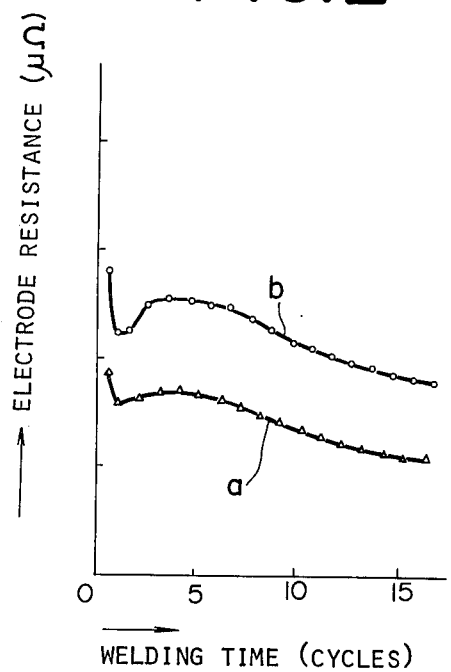
FIG. 2 is a graphical representation of typical relationships between electrode resistance and welding time for the same cases as in FIG. 1.

FIG. 2 shows typical relationships between the resistance between the electrodes and the welding time (hereinafter referred to simply as a "resistance curve"), where the welding conditions are the same as in FIG. 1.

As is well understood, FIG. 2 indicates that the difference in electrode tip diameter exerts a great influence upon the electrode resistance, and the greater the electrode tip diameter, the smaller the electrode resistance (the electrode resistances on the curve a are smaller than those on curve b).

Figure 3:
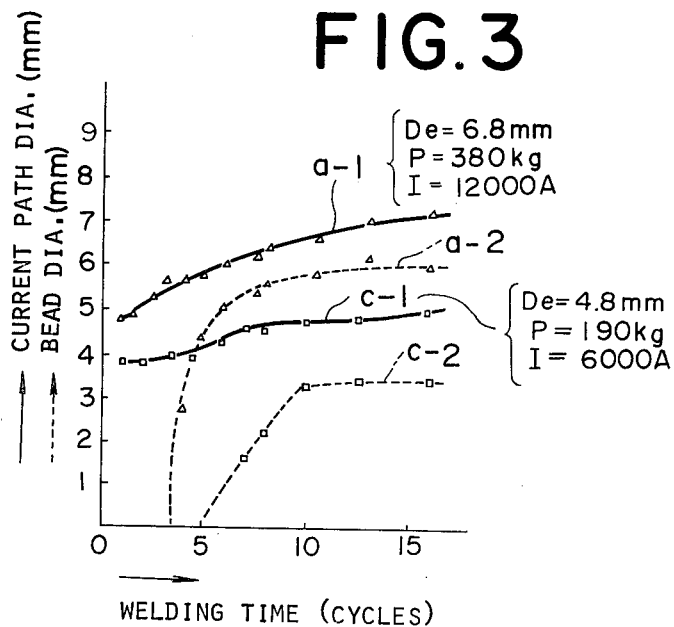
FIG. 3 is a graphical representation of relationships between current path dimension and welding time and between bead diameter and welding time for the same cases as in FIG. 1.

FIG. 3 shows typical relationships between the diameter of the area through which the welding current is passed to the members to be welded (hereinafter referred to as "current path diameter") and welding time (solid lines) and the diameter of bead formed and welding time (dashed lines). The curve a-1 shows the relationship between the current path diameter and welding time where De is 6.8 mm, P is 380 kg, and I is 12000 A. The curve a-2 shows the relationship between bead diameter and welding time under the same conditions as in the curve a-1. The curve c-1 shows the relationship between current path diameter and welding time where De is 4.8 mm, P is 190 kg, and I is 6000 A. The curve c-2 shows the relationship between bead diameter and welding time under the same conditions as in the curve c-1.

FIG. 3 indicates that in the state where a bead is formed there is a close relationship between bead diameter and current path diameter, and these are greatly affected by the diameter of the electrode tip.

Figure 4:
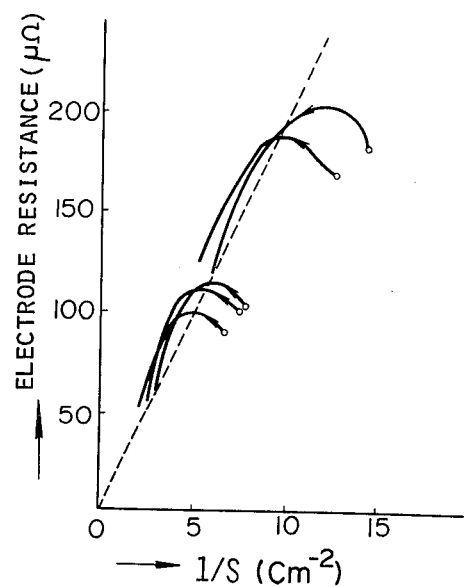
FIG. 4 is a graphical representation of typical relationships between electrode resistance during the welding process under various welding conditions and the reciprocal of the current path area.

FIG. 4 shows the variation in time of the relationship between electrode resistance and the reciprocal of current path area S while the welding current is being passed therethrough under various welding conditions where the shapes and sizes of electrode tip, electrode pressures, electrode currents, etc. are all different from each other. The electrode resistance changes continuously during the welding process, and the direction of the arrows in FIG. 4 indicates the direction in which time elapses.

FIG. 4 indicates that the electrode resistance is approximately proportional to the reciprocal of the current path area after passing through a maximum point thereof, and approaches the same straight line, as shown by the dashed line in FIG. 4, under any welding conditions.

Further, it has been confirmed experimentally that the above-mentioned relationships are also true for aluminum and stainless steel.

These relationships also indicate that it is possible to estimate the current path area of the members to be welded during the welding process by measuring the electrode resistance.

In this case, even if there is another weld near the weld in question, it is possible to estimate the current path area, within almost the same error, from consideration of the electrode resistance.

The voltage and resistance between the welding electrodes include the voltage and resistance between each electrode tip and the equivalent member to be welded, in addition to the values between the two members to be welded; however since the former is generally as small as 20–30 percent of the latter and is approximately constant with respect to welding time, it is possible to regard the electrode voltage and resistance simply as the values between the two members to be welded, disregarding the other values.

The above-mentioned relationships are true regardless of the shapes and sizes of the electrode tips or the kinds of members being welded.

In addition, there is no fundamental change in the tendency even if the thickness or number of members to be welded differ. Accordingly, it is possible to detect the area through which the welding current is passed between materials to be welded by detecting the resistance between electrodes during the welding process.

Since the current path area has a close relationship to the size of the bead formed, it is possible to determine whether or not a desired diameter of the bead is formed at the weld first by predicting a reference resistance curve by which a desired bead diameter can be obtained, that is the desired current path area can be obtained, and next by comparing the electrode resistance with the curve immediately before the electrode current is cut off.

Further, since it has been verified that it is possible to check the heat condition between members to be welded, that is, the rate of bead formation depending upon the electrode voltage while the current is flowing therethrough, it is possible to determine whether or not the rate of bead formation is sufficient by determining whether or not the electrode voltage or the integral of the difference between the electrode voltage in excess of a predetermined base voltage and the predetermined base voltage is above the desired value.

Therefore it is possible to determine whether or not the diameter of bead and the rate of bead penetration satisfy the desired value by detecting and determining the electrode resistance and the electrode voltage.

Figure 5:
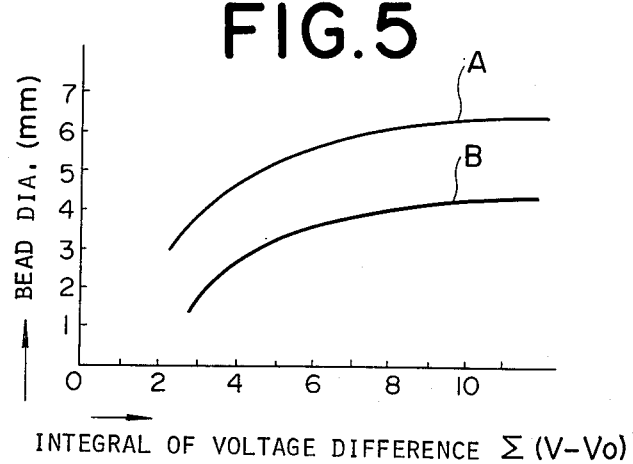
FIG. 5 is a graphical representation of typical relationships between bead diameter with different current path areas and the integral of the difference between the electrode voltage in excess of a predetermined base voltage and the predetermined base voltage.

FIG. 5 shows the relationships between the diameter of bead and the integral of the difference between the electrode voltage in excess of a predetermined base voltage and the predetermined base voltage, the curve A indicating the case where flat electrode tips are used and the curve B indicating the case where round electrode tips are used. These curves indicate that it is possible to determine weld quality by checking the current path area and the integral of voltage difference.

Figure 6:
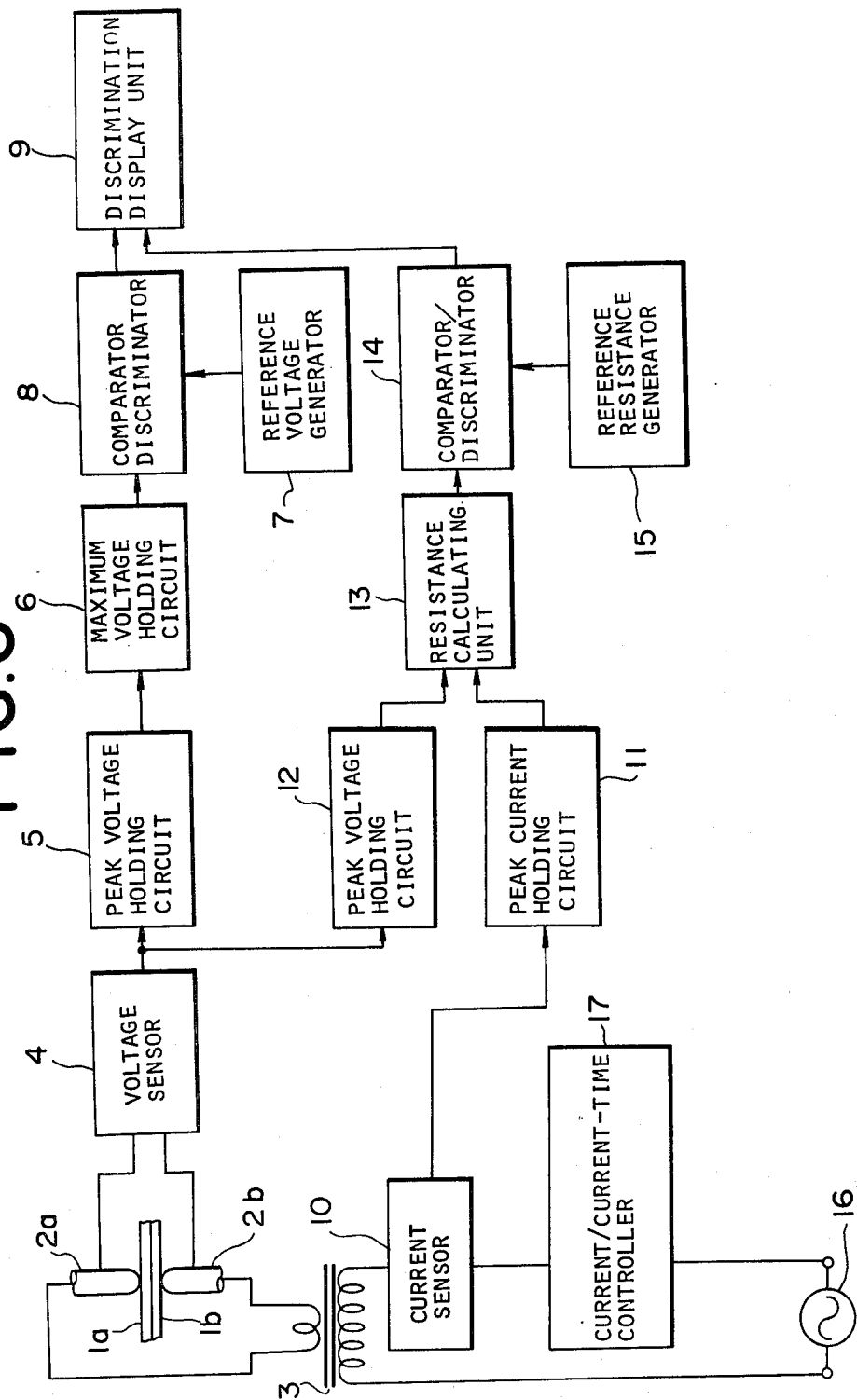
FIG. 6 is a schematic block diagram of a first embodiment according to the present invention, in which weld quality is determined to be acceptable when both the electrode resistance and the maximum electrode voltage lie within the respective allowable ranges.

FIG. 6 is a schematic block diagram of a first embodiment according to the present invention. In this embodiment, the weld quality in the weld is determined by whether or not the resistance between the electrodes immediately before the welding current is cut off is smaller than the predetermined reference resistance value and at the same time whether or not the maximum electrode voltage is beyond the predetermined reference voltage value. This embodiment is especially effective in the case where fluctuations in welding current and changes in welding current time are relatively small.

In the figure, members to be welded 1a and 1b are pinched under pressure by a pair of electrode tips. The welding current is passed through the members 1a and 1b from the secondary coil of a transformer 3. The voltage between the electrode tips 2a and 2b while the welding current is flowing (hereinafter referred to as "electrode voltage") is detected by a voltage sensor 4. In this case, an abnormally high electrode voltage is often detected because of an increase in contact resistance between the members to be welded 1a and 1b, however, it is possible to ignore the initial electrode voltage by using an initial electrode voltage rejector, since the initial electrode voltage does not affect the weld quality.

The voltage detected by the voltage sensor 4 is fed to a peak voltage holding circuit 5 where a representative point of the voltage waveform (for instance, the peak value of each half-wave alternating voltage) is detected and held for a half cycle or for a predetermined period of time. Thereafter, the maximum electrode voltage of the electrode voltages during the welding process is detected and held by a maximum voltage holding circuit 6.

The difference in electrode voltage between the maximum value detected by the voltage sensor 4 and the reference value sent from a reference voltage generator 7 is checked for determination of weld quality, and an acceptance signal is applied to a discrimination display unit 9 when the maximum detected electrode voltage exceeds the reference voltage.

A current sensor 10 such as a current transformer provided on the primary side of a transformer 3 detects the electrode current. The electrode current detected by the current sensor 10 is fed to and held in a peak current holding circuit 11 at the representative point thereof. The electrode voltage detected by the voltage sensor 4 is also fed to and held in another peak voltage holding circuit 12 at the representative point thereof in phase with the electrode current signal.

These two stored signals of electrode voltage and current are fed to a resistance calculating unit 13 to obtain the corresponding electrode resistance immediately before the electrode current is cut off. The calculated resistance value is next compared with the reference resistance value generated from a reference resistance generator 15 by a second comparator/discriminator 14. As a result of this, an acceptance signal is fed to the discrimination display unit 9 from the comparator/discriminator 14 when the detected electrode resistance value is smaller than the reference resistance value.

In this embodiment, although the acceptance signal is outputted whenever the detected electrode resistance value is smaller than the reference resistance value, it is, of course, possible to specify the lower limit of the allowable range when necessary.

In addition, it is possible to detect the electrode current by putting a trochoidal coil for detecting current into the secondary conductor of the transformer 3.

The discrimination display unit 9 indicates "Acceptance" only when two acceptance signals are fed thereinto from the two comparator/discriminators 8 and 14.

In the figure, the reference numeral 16 denotes an alternating current power supply, and 17 denotes a current/current-time controller. The current/current-time controller can pass a predetermined constant current therethrough even when the supply voltage fluctuates, and also send current start and stop signals to pass the required welding current therethrough for the required period of time. The current-time controller further sends out a timing signal for synchronization with other units after the welding current begins to flow, by way of the necessary lines (not shown in the figures).

Figure 7:
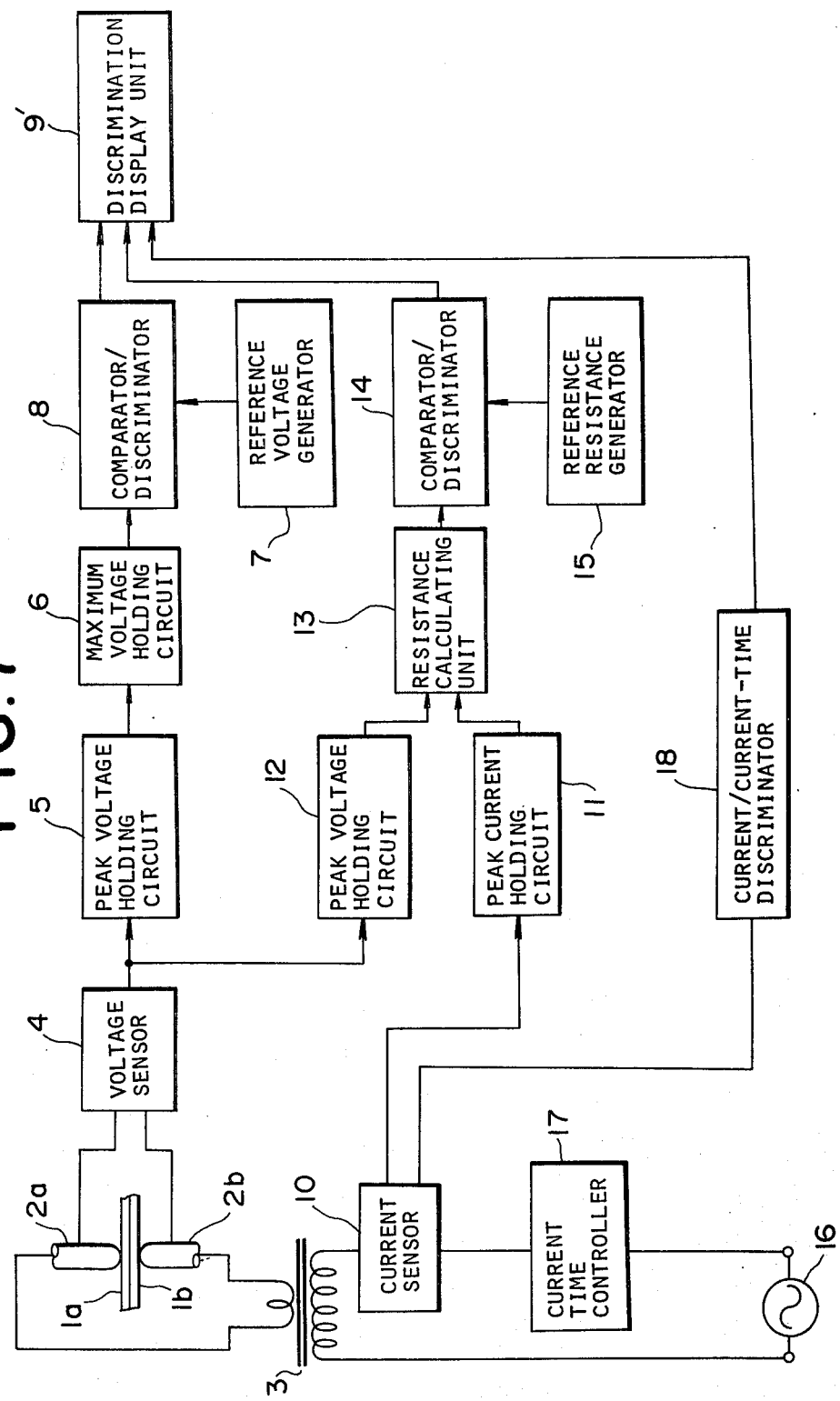
FIG. 7 is a schematic block diagram of a second embodiment according to the present invention, in which weld quality is determined to be acceptable when all of the electrode resistance, the maximum electrode voltage, the electrode current, and the electrode current time lie within the respective allowable ranges.

FIG. 7 shows a schematic block diagram of a second embodiment of the present invention. The points different from the first embodiment of FIG. 6 are that the determination of acceptance is performed only when the electrode resistance immediately before the electrode current is cut off is smaller than the predetermined reference resistance, the maximum electrode voltage is more than the predetermined reference electrode voltage, and further both the electrode current and the time during which the electrode current passes between the electrodes lie within the predetermined allowable ranges.

That is to say, the electrode current detected by the current sensor 10 is fed to a current/current-time discriminator 18 in order to send an acceptance signal to a discrimination display unit 9' only when both the electrode current and the electrode current time lie within the predetermined allowable ranges.

The discrimination display unit 9' indicates "Acceptance" only when all of the comparator/discriminators 8 and 14 and the current/current-time discriminator 18 output the respective acceptance signals.

The description of parts of this embodiment other than the above is the same as in the embodiment in FIG. 6, and are therefore omitted.

By using this method according to the present invention, it is possible to determine weld quality with an accuracy superior to the method of the first embodiment.

Figure 8:
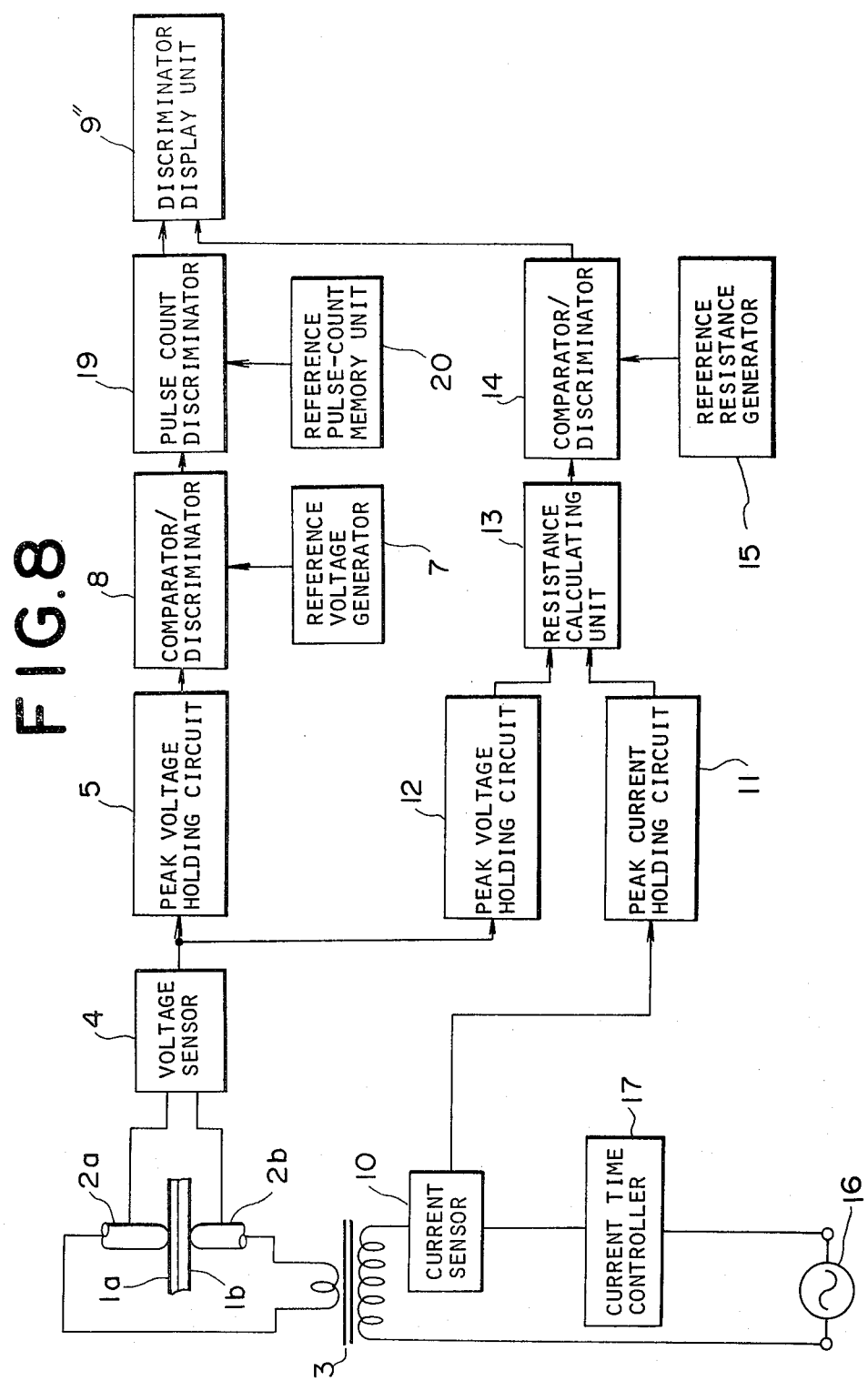
FIG. 8 is a schematic block diagram of a third embodiment according to the present invention, in which weld quality is determined to be acceptable when both the electrode resistance and the number of the electrode voltage signals in excess of a predetermined reference value lie within the respective allowable ranges.

FIG. 8 shows a schematic block diagram of a third embodiment according to the present invention. The points different from the first embodiment of FIG. 6 are that the determination of acceptance is performed only when the electrode resistance immediately before the electrode current is cut off is smaller than the predetermined reference resistance, and also the period of time during which the electrode voltage while the welding current is flowing is beyond the reference voltage continues for a predetermined reference period of time.

That is to say, a pulse count discriminator 19 is additionally provided to shape the pulse waveforms of the output signal from the comparator/discriminator 8 and to count the number of the output pulse signals. An acceptance signal is fed to the discrimination display unit 9" only when the integral of the number of the output pulse signals from the comparator/discriminator 8 within a fixed period coincides with the reference pulse-count stored in a reference pulse-count memory unit 20.

The reason the above-mentioned method is required is this: since the voltage applied to the electrode tips 2a and 2b includes alternating voltage or alternating waveform components, the detected electrode voltage also includes an alternating voltage and accordingly the acceptance signal of the pulse-waveform is outputted from the comparator/discriminator 8 per cycle whenever the electrode voltage exceeds the reference voltage. Therefore, it is preferable first to shape the waveform of the signals so as to have a constant pulse height and next to count the pulse signals in order to detect accurately when the electrode voltage in excess of the reference voltage is kept outputted for a predetermined period of time or more.

In this embodiment, the acceptance display is indicated on the discrimination display unit 9" only when the respective acceptance signals are outputted from the pulse-count discriminator 19 and the comparator/discriminator 14 at the same time.

By using this method according to the present invention, it is possible to determine weld quality with an accuracy superior to the method of the first embodiment.

Figure 9:
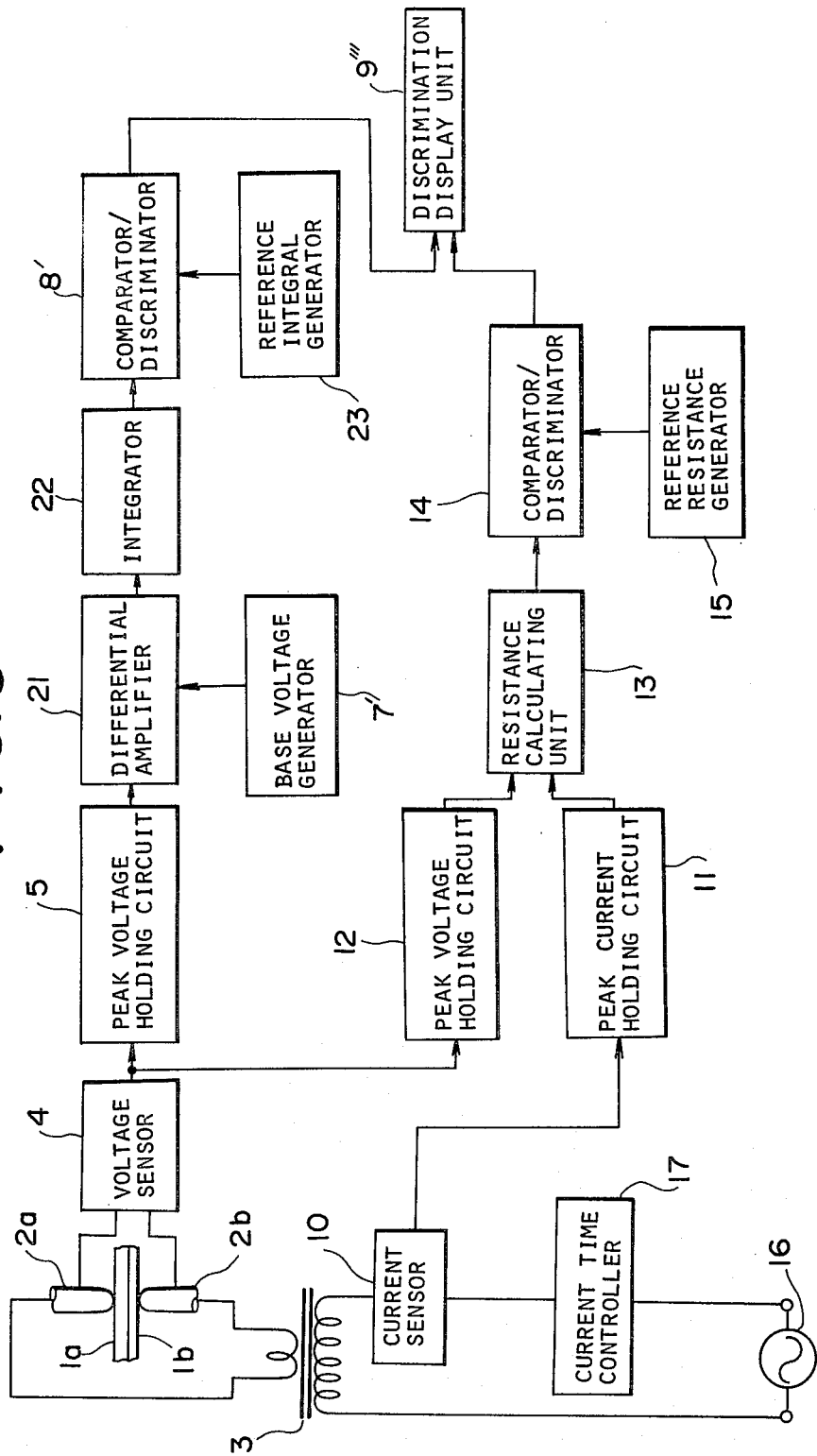
FIG. 9 is a schematic block diagram of a fourth embodiment according to the present invention, in which weld quality is determined to be acceptable when both the electrode resistance and the integral of the difference in voltage between the actual electrode voltage and the reference electrode voltage lie within the respective allowable ranges.

FIG. 9 shows a schematic block diagram of a fourth embodiment of the present invention. The points different from the first embodiment of FIG. 6 are that the determination of acceptance is performed only when the electrode resistance immediately before the electrode current is cut off is smaller than the predetermined reference resistance, and also the integral of the difference between the electrode voltage in excess of a predetermined base voltage and the predetermined base voltage exceeds the reference integral.

That is to say, the output voltage from the peak voltage holding circuit 5 and the predetermined base voltage from a base voltage generator 7' are both inputted to a differential amplifier 21; the difference between the two are detected; the detected result is next integrated by an integrator 22 while the welding current is flowing; the integral is compared with the predetermined reference integral from a reference integral generator 23 by a comparator/discriminator 8'; an acceptance signal is fed to a discrimination display unit 9" only when the integral is more than the reference integral.

Depending upon the method of the present invention, it is also possible to determine weld quality accurately even when the welding current fluctuates or when the waveform of the electrode current is controlled by using thyristors.

Further, in the respective embodiments according to the present invention, it is, of course, possible to indicate "Unacceptance" on the discrimination display unit. Additionally, in this case, it is possible to indicate each unacceptable factor in weld quality such as electrode resistance, voltage, current time, and so on, separately or independently.

In the above embodiments, the operations have been explained applied to spot welding, but it is also possible to apply this invention to other resistance welding such as projection welding, seam welding, flash welding, upset butt welding, series welding, etc. In series welding, however, it is necessary to detect the welding voltages between each electrode tip and the back bar.

The above-mentioned methods of the present invention are also applicable to resistance welding of various materials such as surface-coated steel plate, stainless steel plate, aluminum alloy plate, etc. as well as cold-rolled steel plate.

As described above, according to the present invention, it is possible to determine weld quality accurately, even if the electrode tips are deformed or crushed so as to form other current path areas, by using a relatively low-priced system at each welding site.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A method of determining weld quality in resistance welding independently of variations in current path geometry due to electrode tip deformation, which comprises the steps of:
   (a) detecting a plurality of values of an electrode voltage applied to the welding electrodes between which the members to be welded are pinched;
   (b) detecting a plurality of values of an electrode current flowing between the welding electrodes;
   (c) calculating electrode resistance by dividing the electrode voltage by the electrode current;
   (d) comparing the calculated electrode resistance immediately before the electrode current is cut off with a predetermined electrode resistance;
   (e) comparing the maximum value among the detected electrode voltage values with a predetermined reference electrode voltage; and
   (f) determining that the weld quality is acceptable when both the calculated electrode resistance and the detected maximum electrode voltage lie within the respective allowable ranges,
   whereby the weld quality is determined independently of variations in current path geometry due to deformation or crushing of electrode tips.

2. A method of determining weld quality in resistance welding independently of variations in current path geometry due to electrode tip deformation, which comprises the steps of:
   (a) detecting an electrode voltage applied to the welding electrodes between which the members to be welded are pinched;
   (b) detecting an electrode current flowing between the welding electrodes;
   (c) calculating electrode resistance by dividing the electrode voltage by the electrode current;
   (d) comparing the calculated electrode resistance immediately before the electrode current is cut off with a predetermined electrode resistance;
   (e) comparing the maximum value among the detected electrode voltage values with a predetermined reference electrode voltage;
   (f) comparing the electrode current and the time during which the electrode current is flowing with a predetermined reference electrode current and the predetermined reference electrode current-time; and
   (g) determining that the weld quality is acceptable when all of the calculated electrode resistance, the detected maximum electrode voltage, the detected electrode current, and the electrode time lie within the respective allowable range,
   whereby the weld quality is determined independently of variations in current path geometry due to deformation or crushing of electrode tips.

3. A system for determining weld quality in resistance welding, which comprises:
   means for determining weld quality independently of variations in current path geometry due to electrode tip deformation, including:
   (a) a voltage sensor means for detecting values of the electrode voltage between the welding electrodes between which the members to be welded are pinched while a welding current is flowing;
   (b) a current sensor means for detecting the electrode current flowing between the welding electrodes;
   (c) a resistance calculating means for calculating the electrode resistance depending upon the electrode voltage detected by said voltage current sensor means and the electrode current detected by said current sensor means;
   (d) a reference resistance generator means for generating a reference electrode resistance;
   (e) a first comparator/discriminator means for comparing the electrode resistance value calculated by said resistance calculating means with the reference electrode resistance value generated by said reference resistance generator means and for outputting an acceptance signal when the detected resistance value is less than the reference value;
   (f) a maximum voltage holding circuit means for holding the maximum electrode voltage among a plurality of values of the electrode voltages detected by said voltage sensor means;
   (g) a reference voltage generator means for generating a reference maximum electrode voltage;
   (h) a second comparator/discriminator means for comparing the maximum electrode voltage held in said maximum voltage holding circuit means with the reference maximum electrode voltage from said reference voltage generator means and for outputting an acceptance signal when the detected voltage value is more than the reference value; and
   (i) a discrimination display means for displaying "Acceptance" only when both of said first comparator/discriminator means and said second comparator/discriminator means output the respective acceptance signals thereto.

4. A system for determining weld quality in resistance welding, which comprises:
   (a) a voltage sensor means for detecting values of the electrode voltage between the welding electrodes between which the members to be welded are pinched while a welding current is flowing;
   (b) a current sensor means for detecting the electrode current flowing between the welding electrodes;
   (c) a resistance calculating means for calculating the electrode resistance depending upon the electrode voltage detected by said voltage current sensor means and the electrode current detected by said current sensor means;

(d) a reference resistance generator means for generating a reference electrode resistance;

(e) a first comparator/discriminator means for comparing the electrode resistance value calculated by said resistance calculating means with the reference electrode resistance value generated by said reference resistance generator means and for outputting an acceptance signal when the detected resistance value is less than the reference value;

(f) a maximum voltage holding circuit means for holding the maximum electrode voltage among a plurality of values of the electrode voltages detected by said voltage sensor means;

(g) a reference voltage generator means for generating a reference maximum electrode voltage;

(h) a second comparator/discriminator means for comparing the maximum electrode voltage held in said maximum voltage holding circuit means with the reference maximum electrode voltage from said reference voltage generator means and for outputting an acceptance signal when the detected voltage value is more than the reference value; and (i) a current/current-time discriminator means for comparing the electrode current detected by said current sensor means and the time during which the electrode current is flowing with respective reference values stored therein and for outputting an acceptance signal when the detected current value and the detected current-time value lie within the respective allowable ranges; and (j) a discrimination display means for displaying "Acceptance" only when all of said first comparator/discriminator means, said second comparator/discriminator means, and said current/current-time discriminator means output the respective acceptance signals thereto.

5. A system for determining weld quality in resistance welding as set forth in any of claims 3 and 4 which further comprises a current/current-time controller means for holding the electrode current flowing through the electrodes at a constant value and for outputting start-stop signals and a timing signal for synchronization with other means configuring the system, said controller means being disposed between a power supply and said current sensor means.

6. A system for determining weld quality in resistance welding as set forth in any of claims 3 and 4 which further comprises:

(a) a peak voltage holding circuit means for holding each detected half-wave peak value of the voltage for a half cycle, said circuit means being disposed in connection with said voltage sensor means; and (b) a peak current holding circuit means for holding each detected half-wave peak value of the current for a half cycle, said circuit means being disposed between said current sensor means and said resistance calculating means.

7. A system for determining weld quality in resistance welding as set forth in any of claims 3 and 4 which further comprises an initial electrode voltage rejector means for eliminating the initial electrode voltage which is abnormally high due to an increase in contact resistance between the members to be welded.

* * * * *